(12) United States Patent
Obata et al.

(10) Patent No.: US 10,531,549 B2
(45) Date of Patent: Jan. 7, 2020

(54) X-RAY APPARATUS AND METHOD OF CONTROLLING X-RAY APPARATUS

(71) Applicants: JOB CORPORATION, Yokohamashi, Kanagawa (JP); ISHIDA CO., LTD, Kyoto-shi, Kyoto (JP)

(72) Inventors: Yoshiharu Obata, Ootawara (JP); Shigeru Hanamatsu, Tokyo (JP); Osamu Hirose, Kawasaki (JP); Takashi Kabumoto, Ritto (JP)

(73) Assignees: Job Corporation, Kanagawa (JP); Ishida Co., Ltd., Kyoto (JP)

( * ) Notice: Subject to any disclaimer, the term of this patent is extended or adjusted under 35 U.S.C. 154(b) by 205 days.

(21) Appl. No.: 15/682,909

(22) Filed: Aug. 22, 2017

(65) Prior Publication Data

US 2018/0063934 A1   Mar. 1, 2018

(30) Foreign Application Priority Data

Aug. 25, 2016 (JP) .................... 2016-165062

(51) Int. Cl.
*H05G 1/66* (2006.01)
*G03B 42/02* (2006.01)
*H05G 1/52* (2006.01)
*H05G 1/54* (2006.01)

(52) U.S. Cl.
CPC .............. *H05G 1/66* (2013.01); *G03B 42/02* (2013.01); *H05G 1/52* (2013.01); *H05G 1/54* (2013.01)

(58) Field of Classification Search
CPC . G03B 42/02; H05G 1/34; H05G 1/52; H05G 1/54; H05G 1/66
See application file for complete search history.

(56) References Cited

U.S. PATENT DOCUMENTS

| 4,172,223 | A  | * | 10/1979 | Ishijima | ................. | H05G 1/34 |
| | | | | | | 378/108 |
| 9,125,619 | B2 | * | 9/2015 | Yabugami | .............. | A61B 6/485 |
| 9,301,728 | B2 | * | 4/2016 | Yabugami | .............. | A61B 6/504 |
| 9,338,868 | B2 | * | 5/2016 | Yabugami | ................ | H05G 1/32 |
| 2015/0006093 | A1 | | 1/2015 | Hess | | |

FOREIGN PATENT DOCUMENTS

| JP | H04-66097 U | 6/1992 |
| JP | 2014-039873 A | 3/2014 |
| WO | 2013/135550 A1 | 9/2013 |

* cited by examiner

*Primary Examiner* — Marcus H Taningco
(74) *Attorney, Agent, or Firm* — Carrier Blackman & Associates, P.C.; Joseph P. Carrier; Anne G. Sabourin

(57) ABSTRACT

Provided is an X-ray apparatus and a method of controlling an X-ray apparatus capable of detecting a sign of breakage of a filament. A method of controlling an X-ray apparatus for performing control involving controlling a filament current flowing through a filament of a cathode part to maintain constant a tube current flowing between the cathode part and an anode part with a target, includes: monitoring the current value of at least one of the filament current and the tube current; detecting the mode of change in the current value; determining the presence or absence of a sign of breakage of the filament based on the mode of change in the current value; and issuing a warning based on the determination.

10 Claims, 3 Drawing Sheets

X-RAY APPARATUS AND METHOD OF CONTROLLING X-RAY APPARATUS

TECHNICAL FIELD

The present invention relates to an X-ray apparatus and a method of controlling an X-ray apparatus for controlling a filament current flowing through a filament to control at a constant level a tube current flowing through an X-ray tube, and in particular to an X-ray apparatus and a method of controlling an X-ray apparatus capable of detecting a sign of breakage of a filament.

BACKGROUND ART

Various X-ray apparatuses for performing non-destructive inspection and the like at medical facilities, factories, etc. have been proposed (see PTL 1, for example).

The X-ray apparatus described in PTL 1 controls a filament current flowing through a filament arranged at a cathode part to control at a constant level a tube current flowing between the cathode part and an anode part with a target. As the filament thins and narrows due to deterioration, the resistance of the filament increases and the number of thermoelectrons emitted from the filament increases, so that the tube current increases. In this case, the X-ray apparatus performs control that decreases the filament current in order to maintain the increased tube current at a certain value.

This X-ray apparatus is capable of detecting deterioration of the filament from the amount of decrease in filament current. Generally, the life of a filament is approximately 30,000 hours, that is, the filament lasts about 3 to 5 years.

Meanwhile, some X-ray apparatuses suffer from a trouble of breakage of a filament after several hundred hours to several thousand hours. The X-ray apparatus of PTL 1 cannot predict such unexpected breakage of its filament.

Unexpected breakage of the filament suddenly renders the X-ray apparatus inoperable. In a case where the X-ray apparatus is used for, for example, pre-shipment inspection of industrial products or the like, unexpected breakage of the filament causes a trouble of stoppage of shipment of the industrial products.

CITATION LIST

Patent Literature

[PTL 1] Japanese Examined Utility Model Registration Application Publication No. Hei 04-66097

SUMMARY OF INVENTION

Technical Problem

The present invention has been made in view of the above problem, and an object thereof is to provide an X-ray apparatus and a method of controlling an X-ray apparatus capable of detecting a sign of breakage of a filament.

Solution to Problem

An X-ray apparatus of the present invention for achieving the above object is an X-ray apparatus including an X-ray tube including a cathode part with a filament and an anode part with a target, a power source that supplies electricity to the X-ray tube, and a controlling mechanism that performs control involving controlling a filament current flowing through the filament to maintain constant a tube current flowing through the X-ray tube, characterized in that the X-ray apparatus includes: a current monitoring mechanism that monitors a current value of at least one of the filament current and the tube current; a detecting mechanism that detects a mode of change in the current value acquired by the current monitoring mechanism; a determining mechanism that determines the presence or absence of a sign of breakage of the filament based on the mode of change in the current value detected by the detecting mechanism; and a warning mechanism that issues a warning based on the determination by the determining mechanism.

A method of controlling an X-ray apparatus of the present invention is a method of controlling an X-ray apparatus for performing control involving controlling a filament current flowing through a filament of a cathode part to maintain constant a tube current flowing between the cathode part and an anode part with a target, characterized in that the method includes: monitoring a current value of at least one of the filament current and the tube current; detecting a mode of change in the current value; determining the presence or absence of a sign of breakage of the filament based on the mode of change in the current value; and issuing a warning based on the determination.

Advantageous Effect of Invention

According to the X-ray apparatus and the method of controlling an X-ray apparatus of the present invention, a sign of breakage of the filament can be detected. This is advantageous in avoiding a situation where emergency stop of the X-ray apparatus occurs.

DESCRIPTION OF EMBODIMENTS

An X-ray apparatus and a method of controlling an X-ray apparatus of the present invention will be described below based on illustrated embodiments.

Figure 1:
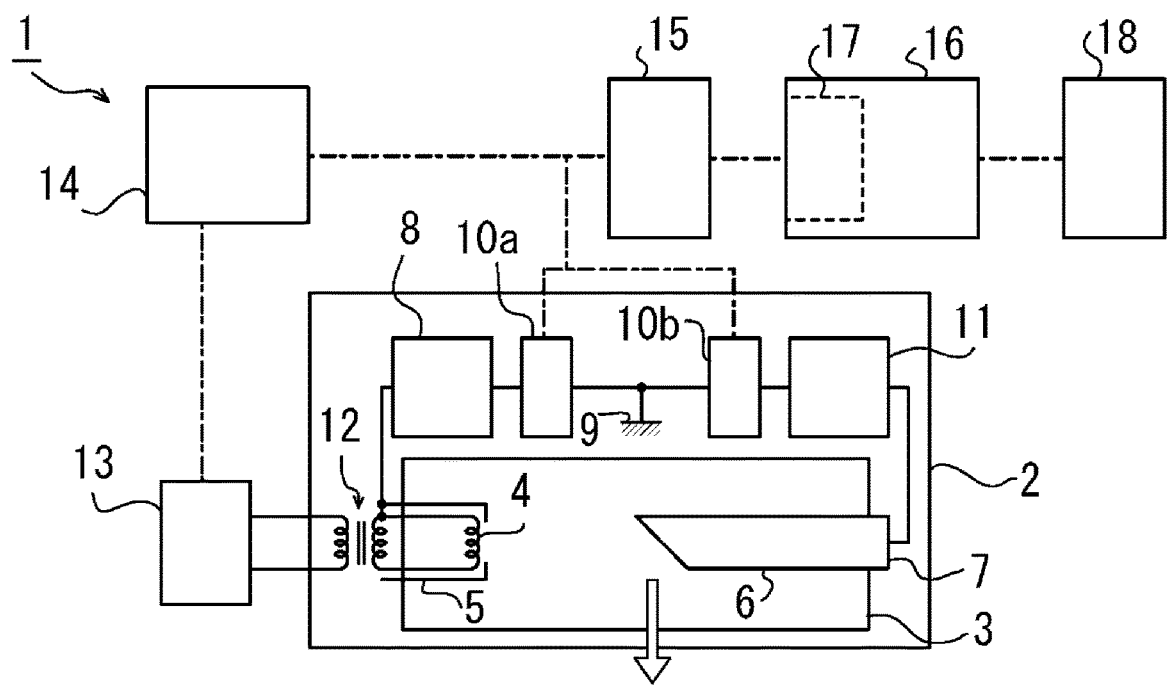
FIG. 1 is an explanatory diagram exemplarily and schematically illustrating an X-ray apparatus of the present invention.

As exemplarily illustrated in FIG. 1, an X-ray apparatus 1 of the present invention includes a housing 2 that blocks X rays except at an X-ray emission orifice through which X rays are emitted to the outside, and an X-ray tube 3 arranged inside this housing 2. The X-ray tube 3 includes a cathode part 5 with a filament 4 and an anode part 7 with a target 6.

A cathode power source 8 is connected to the cathode part 5, and a current monitoring mechanism 10*a* is connected between this cathode power source 8 and earth 9. An anode power source 11 is connected to the anode part 7, and another current monitoring mechanism 10b is connected between this anode power source 11 and the earth 9. Electricity is supplied to the X-ray tube 3 from the cathode power source 8 and the anode power source 11 (hereinafter also referred to collectively as the power sources).

The current monitoring mechanisms 10a, 10b (hereinafter also referred to collectively as the current monitoring mechanism 10) function to monitor current flowing through the X-ray tube 3 (hereinafter also referred to as the tube current) and can be configured of, for example, current detectors. While the current monitoring mechanism 10a may be arranged between the cathode part 5 and the cathode power source 8, the current monitoring mechanism 10a is advantageously arranged between the earth 9 and the cathode power source 8, at which the voltage value is lower, for obtaining the measurement value accurately and stably. Similarly, the other current monitoring mechanism 10b may be arranged between anode part 7 and the anode power source 11. The current monitoring mechanism 10 only needs to be able to monitor the tube current and may therefore only be installed on at least the cathode part 5 side or the anode part 7 side.

While the power sources 8, 11 and the two current monitoring mechanisms 10a, 10b are arranged inside the housing 2 in this embodiment, a configuration in which they are arranged outside the housing 2 may be employed. The inside of the housing 2 is filled with liquid insulating oil, solid insulating resin, or the like.

This X-ray apparatus 1 has a neutral grounded configuration in which the earth 9 is arranged between the cathode power source 8 and the anode power source 11. The power source configuration of the X-ray apparatus 1 of the present invention is not limited to this, but may be a cathode grounded or anode grounded configuration. In the case of the cathode grounded or anode grounded configuration, there may be only one power source to supply electricity to the X-ray tube 3.

A transformer 12 is connected to the filament 4, and a filament power source 13 is connected to this transformer 12. The filament power source 13 of, for example, an inverter type, supplies alternating current to the filament 4 through the transformer 12. The transformer 12 and the filament power source 13 are not essential requirements for the present invention.

The X-ray apparatus 1 includes a controlling mechanism 14 that controls the tube current flowing through the X-ray tube 3. The controlling mechanism 14 is connected to each of the two current monitoring mechanisms 10a, 10b and the filament power source 13 by a signal line. The X-ray apparatus 1 further includes a detecting mechanism 15 that detects the mode of change in the current value measured by the current monitoring mechanisms 10a, 10b. The detecting mechanism 15 is connected to the current monitoring mechanism 10 by signal lines. In FIG. 1, the above-mentioned signal lines are illustrated by chain lines for the sake of explanation. A configuration may be employed in which the transmission and reception of signals through these signal lines are performed wirelessly instead.

To the detecting mechanism 15 is connected a determining mechanism 16 that determines the presence or absence of a sign of future breakage of the filament 4 (hereinafter also referred to as a sign of breakage) based on the mode of change in the current value.

The determining mechanism 16 includes a filtering part 17 that selectively acquires only a piece(s) of data satisfying a predetermined condition(s) in the data of the current value sent from the detecting mechanism 15. This filtering part 17 is not an essential requirement for the present invention. In FIG. 1, the filtering part 17 is illustrated by a broken line for the sake of explanation.

A warning mechanism 18 that issues a warning is connected to the determining mechanism 16. This warning mechanism 18 functions to notify an external entity of information such as a warning based on the determination of the presence or absence of a sign of breakage by the determining mechanism 16. The warning mechanism 18 is configured of, for example, a warning light installed on the X-ray apparatus 1. The warning mechanism 18 may function to display information on a display installed together with the X-ray apparatus 1.

To use the X-ray apparatus 1, high voltage generated by the power sources 8, 11, for example, in the manner of an inverter is applied to the X-ray tube 3. The cathode power source 8 applies a voltage of, for example, −40 kV to the cathode part 5, and the anode power source 11 applies a voltage of, for example, +40 kV to the anode part 7. The degrees of the voltages are not limited to these, but may be optionally set according to the size of the X-ray apparatus 1 and its inspection target.

The filament power source 13 generates an alternating voltage with a frequency of, for example, 20 kHz in the manner of an inverter, for example, and applies it to the filament 4. The frequency of the current flowing through the filament 4 (hereinafter also referred to as the filament current) is not limited to this, but can be optionally set.

As the temperature of the filament 4 rises with supply of electricity, thermoelectrons are emitted from the filament 4. The emitted thermoelectrons are accelerated by the potential difference between the cathode part 5 and the anode part 7 and collide with the target 6 of the anode part 7, thereby generating X rays. In FIG. 1, the direction of emission of the X rays is illustrated by an outlined arrow for the sake of explanation.

Upon detection of a decrease in the tube current flowing through the X-ray tube 3 by means of the current monitoring mechanisms 10a, 10b, the controlling mechanism 14 controls the filament power source 13 to increase the filament current. As the filament current increases, the temperature of the filament 4 rises, thereby increasing the amount of thermoelectrons emitted from the filament 4. Since this amount of thermoelectrons is proportional to the tube current flowing through the X-ray tube 3, the controlling mechanism 14 consequently increases the tube current.

Upon detection of an increase in the tube current by means of the current monitoring mechanisms 10a, 10b, the controlling mechanism 14 performs control that decreases the filament current. In other words, the controlling mechanism 14 decreases the tube current.

As described above, monitoring increase and decrease in the tube current based on the signals from the current monitoring mechanisms 10a, 10b, the controlling mechanism 14 performs control involving controlling the filament power source 13 to maintain the tube current constant.

On the other hand, the detecting mechanism 15 sequentially acquires and accumulates the data of the current value measured by the current monitoring mechanisms 10a, 10b. In other words, the detecting mechanism 15 can acquire the time-series change in the current value. The detecting mechanism 15 may have a configuration that generates a waveform based on the data of the current value. The detecting mechanism 15 can obtain, for example, the waveform exemplarily illustrated in FIG. 2.

Figure 2:
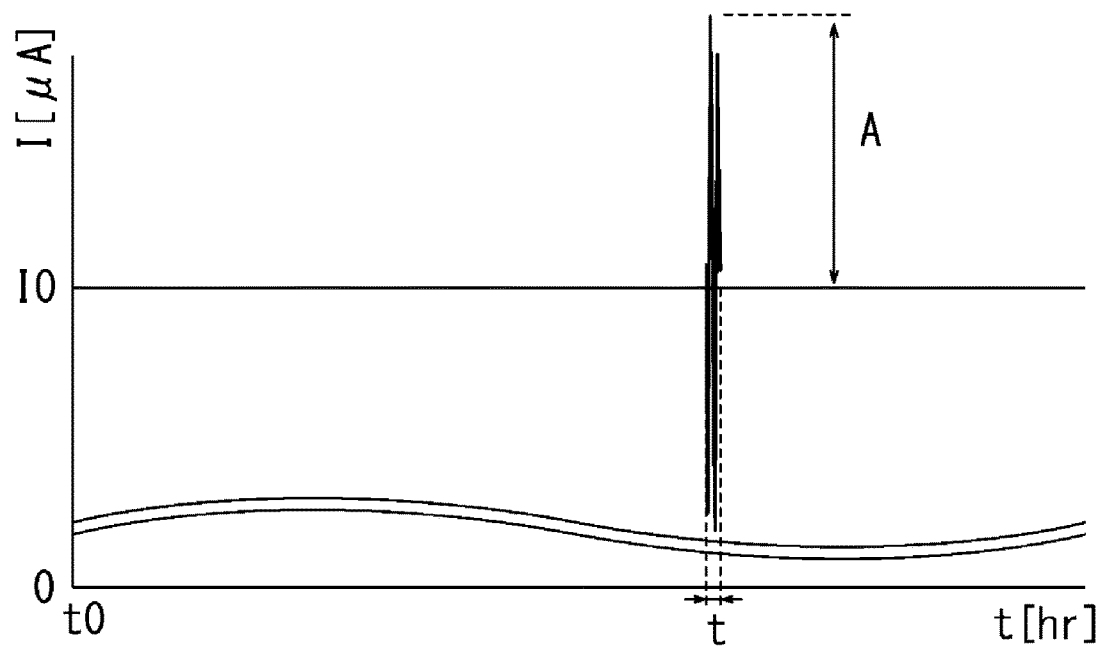
FIG. 2 is an explanatory diagram exemplarily illustrating a mode of change in current value during a normal state.

FIG. 2, with the vertical axis representing current value I (µA) and the horizontal axis representing elapsed time t (hr), FIG. 2 illustrates a mode of change in the current value during a normal state acquired by the detecting mechanism 15. In FIG. 2, reference sign I0 denotes a reference current value at which the current value is controlled to remain constant by the controlling mechanism 14, and reference sign t0 denotes a start time in generation of a waveform for the sake of explanation.

In this description, the mode of change in the current value means at least one of the values of and the amounts of change in amplitude A, frequency f, duration t, etc. of a waveform acquired from continuous change in the current value. Specifically, the determining mechanism 16 determines the presence or absence of a sign of breakage of the filament 4 based on at least one of the above parameters. The determining mechanism 16 may be configured to determine the presence or absence of a sign of breakage based on a combination of some of the above parameters. In the following, the mode of change in the current value is evaluated based on a waveform acquired from time-series change in the current value. However, the present invention is not limited to this. That is, the detecting mechanism 15 may be configured to not to generate a waveform acquired from time-series change in the current value.

As exemplarily illustrated in FIG. 2, during a normal state, the tube current is stable at values substantially equal to the reference current value I0, so that the change in the current value is relatively small. Discharge rarely occurs inside the X-ray tube 3 or between the X-ray tube 3 and the housing 2. In such a case, as exemplarily illustrated in FIG. 2, the current value oscillates once or multiple times with the amplitude A in the range of about several mA to several tens of mA and with the duration t in the range of several µsec.

Figure 3:
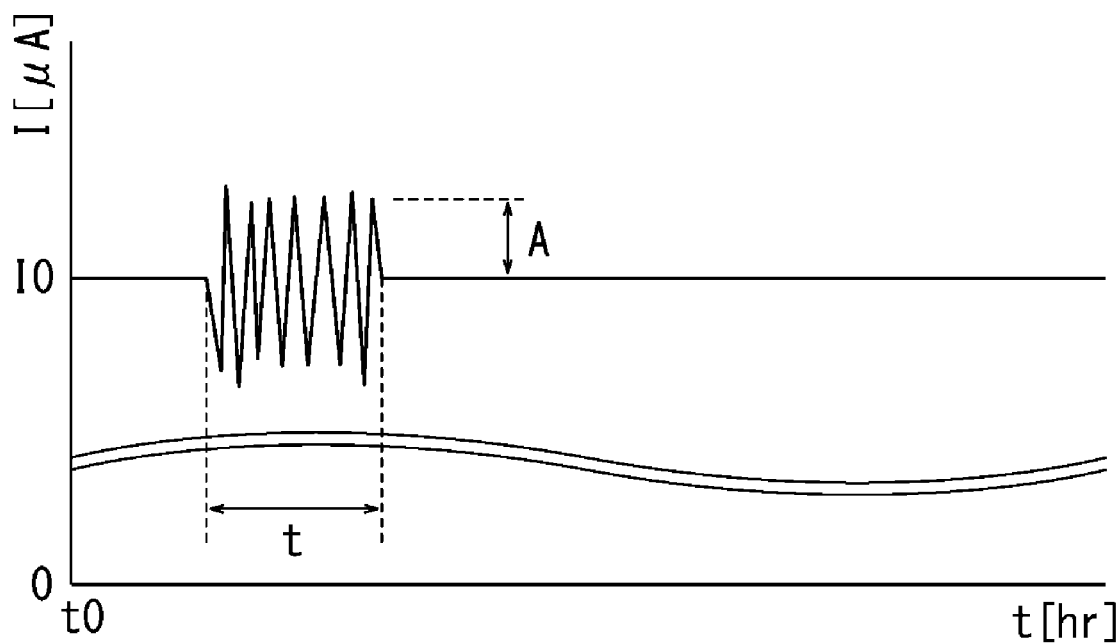
FIG. 3 is an explanatory diagram exemplarily illustrating a mode of change in current value at an initial stage of abnormality.

Conducting an endurance test on the X-ray apparatus, the applicants have found that a mode of change in the current value (waveform) exemplarily illustrated in FIG. 3 is acquired. As exemplarily illustrated in FIG. 3, the mode of change in the current value, which is acquired by the detecting mechanism 15, is an oscillation with an amplitude A of about ±1 to 10 µA, a frequency f of about 1 Hz to 1 kHz, and a duration t of about 1 to 2 hours. After such an oscillation of the current value continues for about one to two hours, the current value becomes stable around the reference current value I0. The mode of change in the current value exemplarily illustrated in FIG. 3 will be referred to as the initial stage of abnormality.

The applicants have found out that grain boundaries in the filament 4 are attributable to the observation of the oscillation of the current value exemplarily illustrated in FIG. 3 even with the tube current controlled by the controlling mechanism 14 to remain constant at the reference current value I0.

The filament 4 of the X-ray tube 3 is generally manufactured by sintering a metal such as tungsten. For this reason, grain boundaries are present in the filament 4.

As the X-ray apparatus 1 is used, minute cracking and displacement occur along grain boundaries in the filament 4 in some cases. Such cracks and the like increase the electric resistance of the filament 4 and decrease the filament current, so that the tube current decreases in proportion to the filament current. The controlling mechanism 14 attempts to bring the decreased tube current back to the reference current value I0, and therefore controls the filament power source 13 to increase the filament current. As the filament current increases, the temperature of the filament 4 rises, so that the metal making up the filament 4 expands and the cracked and displaced sites come into tight contact with each other.

The tight contact of the cracks and the like decreases the electric resistance of the filament 4, thereby abruptly increasing the filament current and accordingly increasing the tube current. The controlling mechanism 14 attempts to bring the increased tube current back to the reference current value I0, and therefore controls the filament power source 13 to decrease the filament current. As the filament current decreases, the temperature of the filament 4 drops, so that the metal making up the filament 4 shrinks and the cracks and the displacement appear again, thus decreasing the filament current.

The applicants have found that repetition of the above phenomenon causes an oscillation of several Hz to several kHz in the current value of the tube current.

Figure 4:
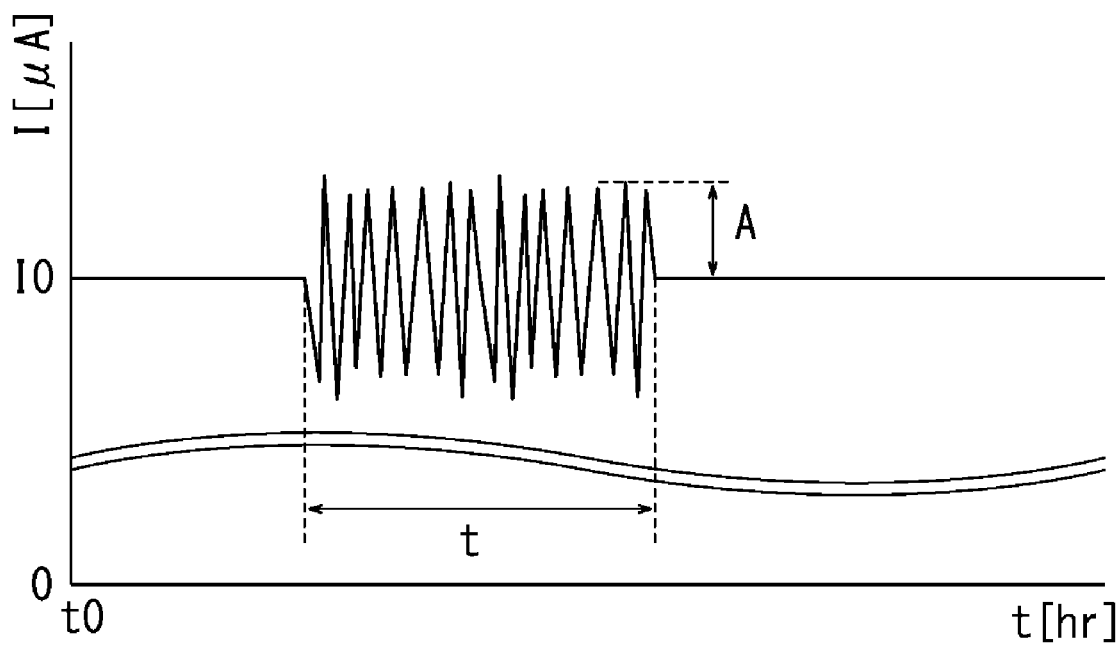
FIG. 4 is an explanatory diagram exemplarily illustrating a mode of change in current value at a middle stage of abnormality.

The applicants have found that a mode of change in the current value (waveform) exemplarily illustrated in FIG. 4 will be acquired if the X-ray apparatus 1 continues to be used after the occurrence of the initial stage of abnormality. As exemplarily illustrated in FIG. 4, the mode of change in the current value, which is acquired by the detecting mechanism 15, is an oscillation with a frequency f not so different from that at the initial stage of abnormality, but with a duration t of about four to five hours and an amplitude A greater than that at the initial stage. After such an oscillation of the current value continues for about four to five hours, the current value then becomes stable around the reference current value I0. The mode of change in the current value exemplarily illustrated in FIG. 4 will be referred to as the middle stage of abnormality.

Figure 5:
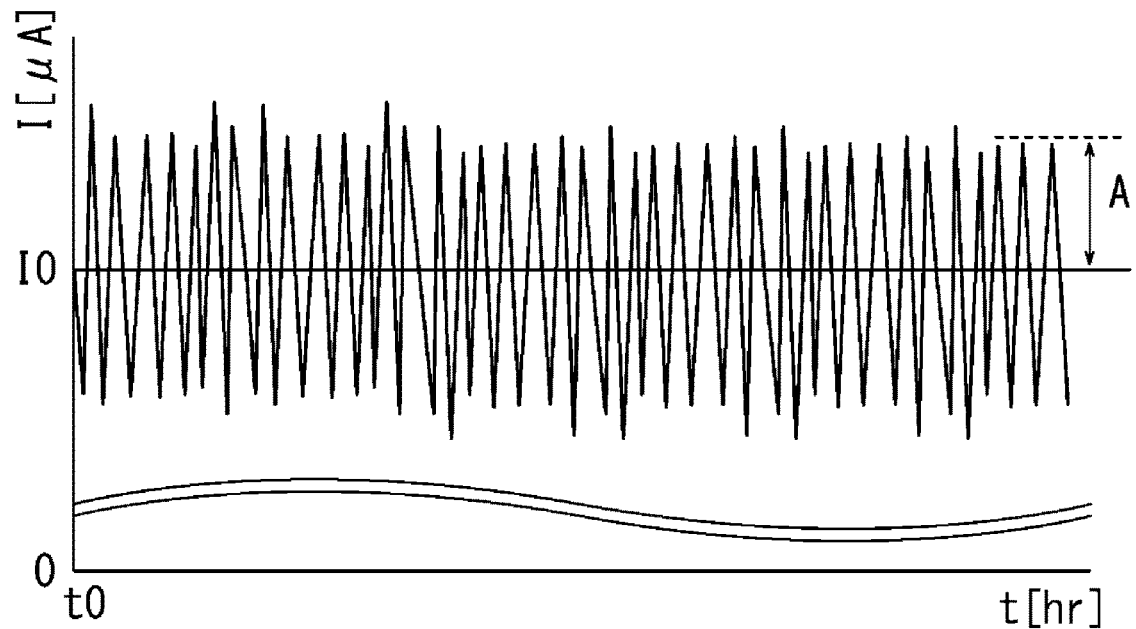
FIG. 5 is an explanatory diagram exemplarily illustrating a mode of change in current value at a later stage of abnormality.

The applicants have found that a mode of change in the current value (waveform) exemplarily illustrated in FIG. 5 will be acquired if the X-ray apparatus 1 further continues to be used after the middle stage of abnormality. As exemplarily illustrated in FIG. 5, the mode of change in the current value, which is acquired by the detecting mechanism 15, is an oscillation with a frequency f not so different from those at the initial and middle stages of abnormality, but with an amplitude A increased to several mA and does not become stable at the reference current value I0 but continues to oscillate. The mode of change in the current value exemplarily illustrated in FIG. 5 will be referred to as the later stage of abnormality.

In a test conducted by the applicants, the mode of change in the current value shifted to the middle stage of abnormality 19 days after the occurrence of the initial stage, and shifted to the later stage 1 day after the middle stage. The filament 4 broke 15 hours after the shift to the later stage. From this test, the applicants have found that there is a correlation between the mode of change in the current value and breakage of the filament 4.

The determining mechanism 16 determines the presence of absence of a sign of breakage of the filament 4 based on the mode of change in the current value sent from the detecting mechanism 15.

For example, the determining mechanism 16 can be configured to determine that a sign of breakage is present upon detection of an oscillation with an amplitude A of 1 µA or greater, a frequency f of less than 20 kHz, which is the oscillation frequency of the inverter power sources, such as the power sources 8, 11 and the filament power source 13, and a duration t of 0.5 hours or longer. The warning mechanism 18 issues a warning based on this determination by the determining mechanism 16. For example, the warning mechanism 18 may be configured to illuminate a red light when the determining mechanism 16 determines that a sign of breakage is present, and illuminate a green light when the determining mechanism 16 determines that no sign of breakage is present.

For example, with direct-current components cut and then with a frequency such as 10 kHz or 100 Hz set as a predetermined threshold in advance, the determining mechanism 16 may be configured to determine that a sign of breakage is present when the detecting mechanism 15 detects a frequency f less than this threshold. In this case, the determining mechanism 16 determines that a sign of breakage is present regardless of the values of the amplitude A and the duration t.

According to this configuration, the determining mechanism 16 can determine that a sign of breakage is present when the initial stage of abnormality occurs. Since the warning mechanism 18 issues a warning based on this determination, the operator can take a measure such as replacement of the X-ray tube 3 with time to spare. This is advantageous in avoiding emergency stop of the X-ray apparatus 1.

The determining mechanism 16 can be configured to determine that a sign of breakage is present, for example, when an oscillation with an amplitude A of 1 μA or greater and a frequency f of less than 20 kHz continues for a predetermined length of time or longer. The warning mechanism 18 issues a warning based on this determination. A threshold for the duration t of the oscillation can be set to, for example, 4.0 hours or longer, 6.0 hours or longer, etc. This duration t is the time of continuance of an oscillation with a frequency f of less than 20 kHz.

According to this configuration, the determining mechanism 16 can determine that sign of breakage is present when the middle stage of abnormality occurs. When the filament 4 is about to certainly break in a near future, the determining mechanism 16 determines that a sign of breakage is present while being hardly affected by errors in the measurement by the detecting mechanism 15. This is economically advantageous since replacement of the X-ray tube 3 or the like will be less likely to be performed unnecessarily.

For example, the determining mechanism 16 may be configured to determine that a sign of breakage is present upon occurrence of an oscillation with an amplitude A of 1 μA or greater and a frequency f of less than 20 kHz and to determine that no sign of breakage is present when the amplitude A is less than 1 μA or the frequency f is 20 kHz or greater. Further, the warning mechanism 18 may be configured to issue a warning when determination that a sign of breakage is present and determination that no sign of breakage is present are repeated a predetermined number of times. The warning mechanism 18 can be configured to issue a warning when the determining mechanism 16 determines that a sign of breakage is present, for example, five times.

According to this configuration, a warning is issued by determining the presence or absence of a sign of breakage of the filament 4 based on a specific phenomenon that occurs before breakage of the filament 4, i.e. the repetitive switching between the normal state where the current value is stable around the reference current value I0 and an oscillating state where the current value oscillates. This is advantageous in reducing the likelihood of falsely recognizing a phenomenon other than a sign of breakage of the filament 4 and performing replacement of the X-ray tube 3 or the like unnecessarily.

According to the X-ray apparatus 1 of the present invention, a sign of breakage of the filament 4 can be detected before it breaks, and a measure such replacement of the X-ray tube 3 can be taken in advance. This is advantageous in avoiding a situation where emergency stop of the X-ray apparatus 1 occurs. The present invention is advantageous in avoiding stoppage of an inspection line at a factory or the like and minimizing the time of stoppage of the inspection line.

It is particularly effective to apply the present invention to an X-ray apparatus that continuously emits X rays at a factory or the like. It is also effective to apply the present invention to, for example, an X-ray apparatus used at an airport security check, an X-ray apparatus for inline inspection of electronic components, an X-ray apparatus for inspection of foreign matters in food products, and the like since these X-ray apparatuses are usually used continuously.

The warning mechanism 18 may be configured to issue a warning multiple times. For example, the warning mechanism 18 can be configured to issue an initial warning when the initial stage of abnormality occurs, and to issue a middle warning when the middle stage of abnormality occurs. Alternatively, the warning mechanism 18 can be configured to issue a first-time warning, a second-time warning, and so on according to the number of times the determining mechanism 16 has determined that a sign of breakage is present.

With the configuration in which the warning mechanism 18 issues a warning multiple times according to the mode of change in the current value, it is possible to determine the appropriate timing for replacement of the X-ray tube 3 or the like based on the balance between the urgency of replacement of the X-ray tube 3 or the like and the influence that would be caused by stoppage of the X-ray apparatus 1.

The warning mechanism 18 may be configured to transmit a warning to a mobile terminal of the operator responsible for maintenance of the X-ray apparatus 1 and the like. Since there is a period of, for example, about three weeks before breakage of the filament 4 after the initial stage of abnormality, the operator can perform replacement and the like starting from the X-ray tube 3, which has high priority.

The filtering part 17, installed in the determining mechanism 16, can be configured of, for example, a band-pass filter that is formed of an electric circuit and cuts direct-current components. The filtering part 17 can be configured to pass only oscillations with frequencies of, for example, less than 20 kHz in the data of the current value acquired by the detecting mechanism 15.

This filtering part 17 may have a configuration that programmatically removes oscillations with a predetermined frequency f and greater.

Since the filtering part 17 removes oscillations with the predetermined frequency f and greater, high-frequency oscillations as exemplarily illustrated in FIG. 2 caused by a discharge or the like can be removed. This is advantageous in improving the accuracy of determining the presence or absence a sign of breakage of the filament 4, and is advantageous in avoiding a trouble of falsely determining the presence or absence a sign of breakage of the filament 4 and replacing the X-ray tube 3 when the filament 4 has no problem.

Figure 6:
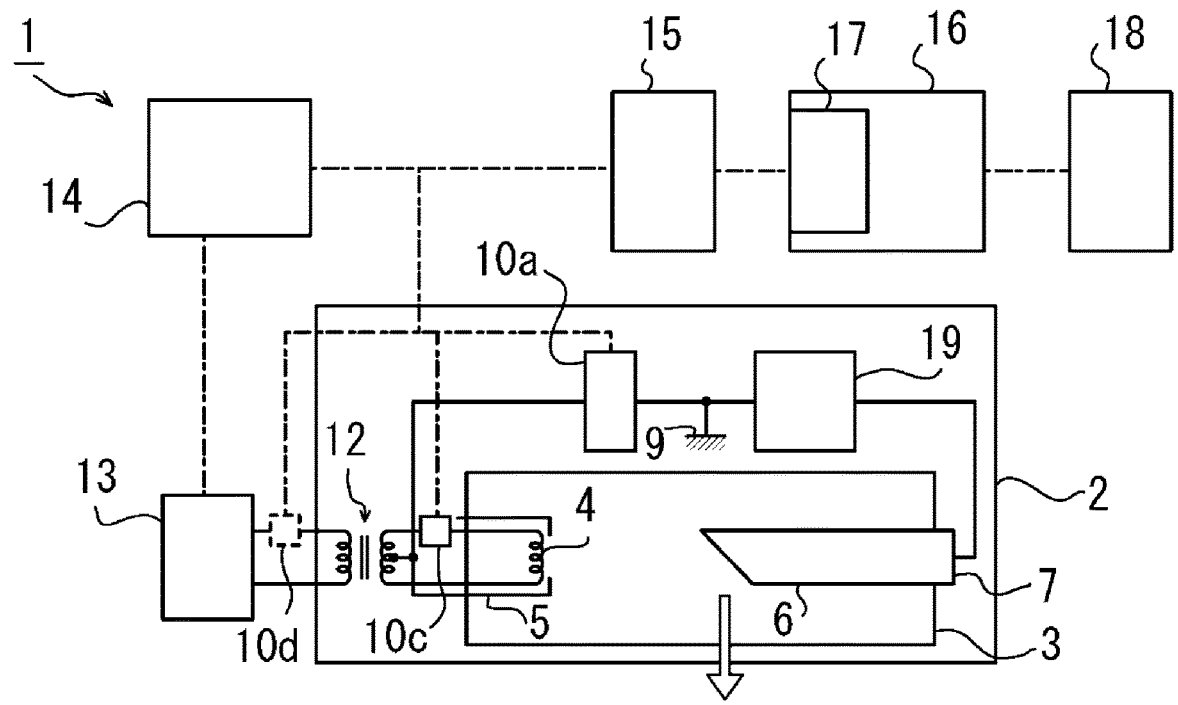
FIG. 6 is an explanatory diagram exemplarily illustrating a modification of the X-ray apparatus in FIG. 1.

As exemplarily illustrated in FIG. 6, the X-ray apparatus 1 may employ a configuration in which it includes a current monitoring mechanism 10c that directly monitors the filament current. This current monitoring mechanism 10c is arranged on the secondary side of the transformer 12. A configuration may be employed in which a current monitoring mechanism 10d is arranged on the primary side of the transformer 12 in place of the current monitoring mechanism 10c. In FIG. 6, the current monitoring mechanism 10d is illustrated by a broken line for the sake of explanation.

The current monitoring mechanisms 10c, 10d monitor the current value of the filament current flowing through the filament 4.

The detecting mechanism 15 desirably detects a state free of the influence of the frequency of the current from the filament power source 13 flowing through the filament 4. For this reason, it is desirable to provide the detecting mechanism 15 with a filtering part 17 that removes the oscillation of the alternating current. For example, in a case where the frequency of the alternating current flowing through the filament 4 is 20 kHz, the filtering part 17 can be configured to pass only frequencies less than 20 kHz.

The X-ray apparatus 1 in this embodiment has a cathode grounded configuration in which the cathode part 5 is grounded to the earth 9.

Any oscillation of the current value observed as a sign of breakage of the filament 4 occurs similarly on both the tube current flowing through the X-ray tube 3 and the filament current flowing through the filament 4. Then, the current monitoring mechanism 10 may only be installed at a position where it can monitor at least one of the tube current and the filament current. While at least one current monitoring mechanism 10 may only need to be installed, a configuration may be employed in which, for example, current monitoring mechanisms 10 are installed at three positions for the cathode part 5, the anode part 7, and the filament 4.

The configuration in which multiple current monitoring mechanisms 10 are installed can improve the accuracy of determination of the presence or absence of a sign of breakage of the filament 4. For example, if discharge occurs between the housing 2 and the cathode part 5, only the current monitoring mechanism 10a, installed for the cathode part 5, experiences a change in its current value. Also, the current value measured by some of the current monitoring mechanisms 10 might change due to, for example, a noise from other equipment installed at the factory or the like. On the other hand, a mode of change in current value indicating a sign of breakage of the filament 4 is detected in the same fashion by all of the multiple current monitoring mechanisms 10. For this reason, the detecting mechanism 15 can easily distinguish between a mode of change in current value occurring due to a different cause such as discharge or noise and a mode of change in current value indicating a sign of breakage of the filament 4.

In this embodiment too, the determination of a sign of breakage of the filament 4 and the like are performed similarly to the previous embodiment.

Thresholds for the amplitude A, the frequency f, and the duration t for determining that a sign of breakage is present in the mode of change in current value are not limited to the above-mentioned values. The thresholds can be optionally set according to the material, thickness, and length of the filament 4.

In the embodiment of FIG. 1, the configuration can be such that, in a case where the alternating current supplied from the filament power source 13 is, for example, 10 kHz, a sign of breakage is determined to be present when an oscillation of the current value with a frequency f of 1 kHz or less is acquired. Specifically, the threshold for the frequency f for determining that a sign of breakage is present in the mode of change in the current value can be set within the range of, for example, 0.1 Hz to 1000 Hz. The determining mechanism 16 determines that a sign of breakage is present when the frequency f of the current value acquired is less than or equal to this threshold.

This threshold for the frequency f is not limited to the above but can be optionally set. Although the frequency f acquired as a sign of breakage differs depending on the diameter of the filament 4, the degree of the output of the X-ray tube 3, and so on, the threshold for the frequency f may be set, for example, between 1 Hz to 100 Hz and is desirably set between 1 Hz to 10 Hz. The lower the threshold for the frequency f is set (e.g. 10 Hz), the easier it is to eliminate the influence of changes in the current value due to different causes such as discharge and noise.

In a case where the current supplied to the filament 4 is direct current, the current monitoring mechanism 10 is hardly affected the frequency of the current supplied. The threshold for the frequency f can be set similarly to the above.

The threshold for the duration t for determining that a sign of breakage is present in the mode of change in the current value can be set within the range of, for example, 0.1 hours to 10.0 hours. The determining mechanism 16 determines that a sign of breakage is present when the duration t of oscillation of the current value acquired is greater than or equal to this threshold. This threshold for the duration t is not limited to the above but can be optionally set. The duration of oscillation of the current value occurring due to discharge or the like is an extremely short time, e.g. several μsec. Hence, this discharge or the like and a sign of breakage of the filament 4 can be well distinguished from each other.

The threshold for the amplitude A for determining that a sign of breakage is present in the mode of change in the current value can be set within the range of, for example, 0.1 μA to several mA. The determining mechanism 16 determines that a sign of breakage is present when the amplitude A of oscillation of the current value acquired is greater than or equal to this threshold.

The determining mechanism 16 may be configured to determine the presence or absence of a sign of breakage of the filament 4 based on any one of the frequency f, the duration t, and the amplitude A of the mode of change in the current value, or configured to determine the presence or absence of a sign of breakage based on a combination of some of the above values.

The arrangements and configurations of the power sources and the like of the X-ray apparatus 1 of the present invention are not limited to the above. The X-ray apparatus 1 may only need to include at least one current monitoring mechanism 10 and a configuration to determine the presence or absence of a sign of breakage of the filament 4 from the mode of change in the current value acquired from this current monitoring mechanism 10.

REFERENCE SIGNS LIST

1 X-ray apparatus
2 housing
3 X-ray tube
4 filament
5 cathode part
6 target
7 anode part
8 cathode power source
9 earth
10, 10a, 10b, 10c, 10d current monitoring mechanism
11 anode power source
12 transformer
13 filament power source
14 controlling mechanism
15 detecting mechanism
16 determining mechanism
17 filtering part 18 warning mechanism
I0 reference current value
t0 start time
A amplitude
f frequency
t duration

The invention claimed is:

1. An X-ray apparatus including
an X-ray tube including a cathode part with a filament and an anode part with a target,
a power source that supplies electricity to the X-ray tube, and
a controlling mechanism that performs control involving controlling a filament current flowing through the filament to maintain constant a tube current flowing through the X-ray tube,
characterized in that the X-ray apparatus comprises:
a current monitoring mechanism that monitors a current value of at least one of the filament current and the tube current;
a detecting mechanism that detects a mode of change in the current value acquired by the current monitoring mechanism;
a determining mechanism that determines the presence or absence of a sign of breakage of the filament based on the mode of change in the current value detected by the detecting mechanism; and
a warning mechanism that issues a warning based on the determination by the determining mechanism;
wherein the determining mechanism is configured to determine that the sign of breakage is present in a case where a frequency of the mode of change in the current value detected by the detecting mechanism is less than a predetermined threshold.

2. The X-ray apparatus according to claim 1, wherein the determining mechanism includes a filtering part that passes only frequencies less than a predetermined threshold among frequencies of the mode of change in the current value acquired from the detecting mechanism.

3. The X-ray apparatus according to claim 1, wherein the determining mechanism is configured to determine that the sign of breakage is present in a case where oscillation of the mode of change in the current value detected by the detecting mechanism continues for a predetermined length of time or longer.

4. The X-ray apparatus according to claim 1, wherein the warning mechanism is configured to issue a warning in a case where the determining mechanism repeats determination that the sign of breakage is present and determination that the sign of breakage is absent a predetermined number of times.

5. The X-ray apparatus according to claim 2, wherein the determining mechanism is configured to determine that the sign of breakage is present in a case where oscillation of the mode of change in the current value detected by the detecting mechanism continues for a predetermined length of time or longer.

6. The X-ray apparatus according to claim 2, wherein the warning mechanism is configured to issue a warning in a case where the determining mechanism repeats determination that the sign of breakage is present and determination that the sign of breakage is absent a predetermined number of times.

7. A method of controlling an X-ray apparatus for performing control involving controlling a filament current flowing through a filament of a cathode part to maintain constant a tube current flowing between the cathode part and an anode part with a target, characterized in that the method comprises:
monitoring a current value of at least one of the filament current and the tube current;
detecting a mode of change in the current value;
determining the presence or absence of a sign of breakage of the filament based on the mode of change in the current value; and
issuing a warning based on the determination;
wherein the sign of breakage of the filament is determined to be present in a case where a frequency of the mode of change in the current value is less than a predetermined threshold.

8. The method of controlling an X-ray apparatus according to claim 7, wherein the sign of breakage of the filament is determined to be present in a case where oscillation of the mode of change in the current value continues for a predetermined length of time or longer.

9. The method of controlling an X-ray apparatus according to claim 7, wherein the warning is issued in a case where determination that the sign of breakage is present and determination that the sign of breakage is absent are repeated a predetermined number of times.

10. The method of controlling an X-ray apparatus according to claim 8, wherein the warning is issued in a case where determination that the sign of breakage is present and determination that the sign of breakage is absent are repeated a predetermined number of times.

* * * * *